United States Patent [19]
Behr

[11] Patent Number: 5,397,075
[45] Date of Patent: Mar. 14, 1995

[54] SEAT BELT PRETENSIONER

[75] Inventor: Leonard W. Behr, White Lake, Mich.

[73] Assignee: Automotive Systems Laboratory, Inc., Farmington Hills, Mich.

[21] Appl. No.: 119,501

[22] Filed: Sep. 10, 1993

[51] Int. Cl.⁶ .......................................... B65H 75/48
[52] U.S. Cl. ................................................ 242/374
[58] Field of Search ......... 242/107, 107.4 R, 107.4 A, 242/107.9 B, 374; 280/801 A, 806, 807

[56] References Cited
U.S. PATENT DOCUMENTS 4,434,953  3/1984  Gemar et al. ............. 242/107.4 RX
4,508,287  4/1985  Nilsson ...................... 242/107.4 RX

FOREIGN PATENT DOCUMENTS 764822   8/1967  Canada ........................ 242/107.4 R
3231509  3/1984  Germany ..................... 242/107.4 R Primary Examiner—Daniel P. Stodola
Assistant Examiner—John P. Darling
Attorney, Agent, or Firm—Lyman R. Lyon

[57] ABSTRACT

A pretensioner for a seat belt utilizes a relatively inexpensive gas-producing cartridge that is easily replaced after activation so as to condition the pretensioner for subsequent use. The cartridge is similar to a shotgun shell and is chambered in a breech block. The cartridge contains a gas-producing pyrotechnic and a piston. Upon ignition, gas produced by the pyrotechnic effects advancement of the piston which, through an associated mechanism, takes up slack in the seat belt.

3 Claims, 2 Drawing Sheets

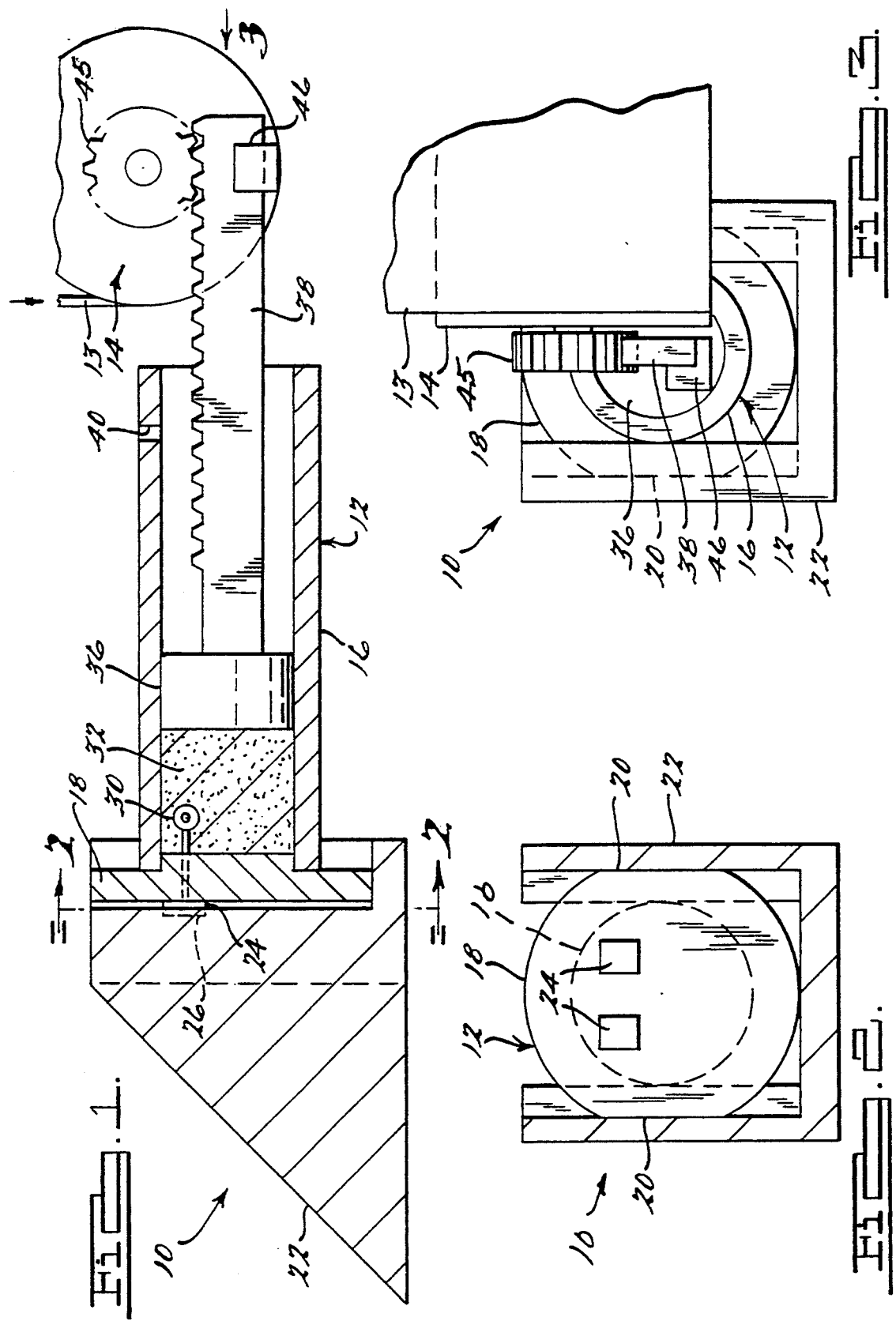

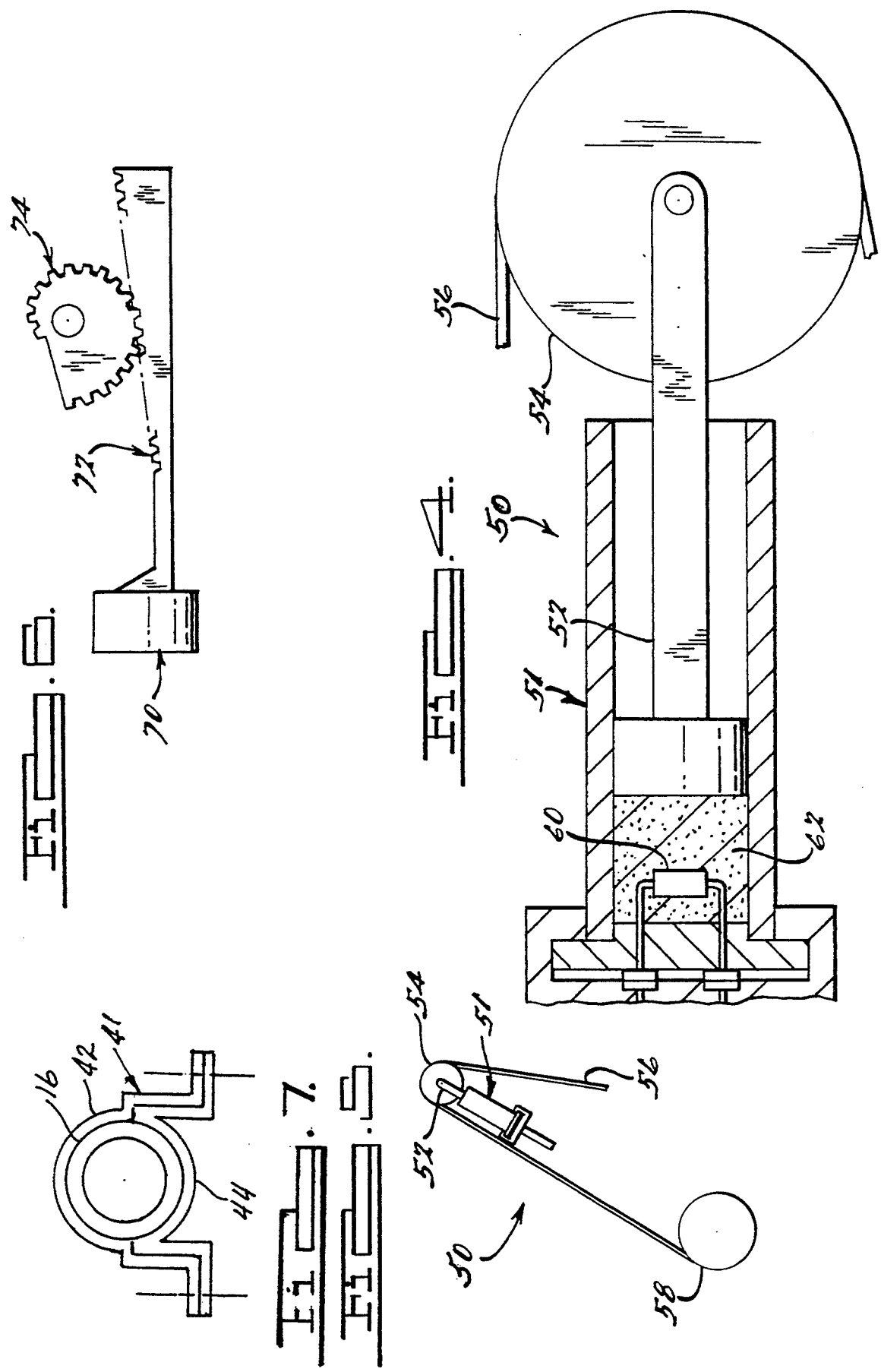

SEAT BELT PRETENSIONER

BACKGROUND OF THE INVENTION

The present invention relates to seat belt pretensioners and, more specifically, to a seat belt pretensioner that utilizes a replaceable pyrotechnic cartridge.

Seat belt pretensioners remove slack from a seat belt in the event of a collision in order to minimize forward movement of the passenger. While it is known to use pyrotechnic gas generators to operate mechanisms which wind up or otherwise pull in slack in the seat belt during a collision, such known pyrotechnic gas generators are generally disposed internally of a seat belt retractor. Thus, the vehicle owner is faced with a significant cost penalty in that the entire pretensioner and retractor assembly must be replaced after activation because of the inability to conveniently reload the propellant charge and because high-temperature gases tend to abrade interior metal surfaces and produce ash and clinkers which bind up the retraction mechanism.

Another problem with known pretensioners is that they are designed to activate only in severe accidents, for example, accidents that exhibit "G" forces sufficient to activate the vehicle airbags. Safety system designers generally choose such a relatively high activation threshold due to the expense of replacing the entire seat belt retractor and pretensioner assembly after activation. As a result, seat belt pretensioners do not protect passengers in less severe accidents.

A related problem with known pretensioners is that when the pretensioner is activated only in severe accidents, activation is relatively late in the crash sequence. Thus, the pretensioner must rapidly take up slack in the seat belt, sometimes injuring the passenger.

SUMMARY OF THE INVENTION

The aforesaid problems are solved, in accordance with a preferred constructed embodiment of the present invention, by a seat belt pretensioner that utilizes a relatively inexpensive gas-producing cartridge that is easily replaced after activation so as to condition the pretensioner for subsequent use.

The replaceable cartridge is similar to a shotgun shell. In the preferred embodiment of the invention, the cartridge comprises a metal casing having a gas-producing pyrotechnic and a piston with a rack attached. The replaceable cartridge is chambered in a breech block. Upon ignition, gas produced by the pyrotechnic drives the piston and rack axially of the cartridge. The rack is meshed with a pinion gear which rotates a standard seat belt retraction mechanism so as to retract the belt.

After use, only the cartridge, including the piston and rack, need be replaced, obviating the expense of replacing other components of the seat belt retraction mechanism.

Because expense heretofore associated with activation of a pretensioner is significantly reduced, passengers can be given the protection of seat belt pretensioning in even minor accidents. Moreover, a pretensioner which activates in minor collisions will also activate earlier in a severe crash sequence. Earlier activation of the pretensioner permits the pretensioner to operate less aggressively, reducing the possibility of injury caused by the seat belt pretensioner itself.

BRIEF DESCRIPTION OF THE DRAWINGS

FIG. 1 is a diagrammatic elevational view, partially in cross-section, of a replaceable seat belt pretensioner cartridge chambered in a breech block with the rack thereof in engagement with the pinion gear of a belt retraction mechanism;

FIG. 2 is a view taken along the line 2—2 of FIG. 1;

FIG. 3 is a view taken in the direction of the arrow "3" of FIG. 1;

FIG. 4 is a view, similar to FIG. 1, of an alternate embodiment of the pretensioner cartridge showing the piston thereof connected to a pulley;

FIG. 5 is a diagrammatic view of the pretensioner of FIG. 4 showing orientation of the pulley relative to the seat belt retractor mechanism;

FIG. 6 shows an alternate embodiment of the cartridge piston, rack and pinion; and FIG. 7 shows an alternate mounting system for the pretensioner.

DESCRIPTION OF THE PREFERRED EMBODIMENT

Referring to FIGS. 1-3, a pretensioner 10 in accordance with a preferred embodiment of the invention, comprises a replaceable cartridge 12 adapted to pretension a seat belt 13 of a conventional seat belt retractor 14. A typical seat belt retractor to which the pretensioner of the present invention has application, is taught in U.S. Pat. No. 4,558,832.

The cartridge 12 comprises a cylinder 16, made from, for example, steel, brass, or aluminum, having a cap 18 closing one end. The cap 18 has parallel keying surfaces 20 to control orientation of the cartridge 12 upon insertion thereof into a complementary breech block 22. When the cartridge 12 is inserted into the breech block 22, the keying surfaces 20 align a pair of electrical contacts 24 on the cap 18 with complementary contacts 26 on the breech block 22. The contacts 24 on the cartridge 12 lead to a conventional igniter 30 for the ignition of a gas-producing pyrotechnic material 32. Ignition of the gas-producing pyrotechnic 32 drives a piston 36 and integral rack 38 to the right, as seen in FIG. 1. A pressure relief vent 40 is provided at the end of the cylinder 16 to vent excess gas pressure to atmosphere after the rack 38 on the piston 36 has been fully advanced.

The rack 38 engages a pinion gear 45 on the seat belt retractor 14 to effect retraction of the belt 13. A guide block 46 maintains the rack 38 in engagement with the pinion gear 42.

As seen in FIG. 7 a mounting bracket 41 formed of two hemispherical sections 42 and 44 surround cylinder 16. The bracket 41 serves the dual function of holding the cartridge 12 in place and of providing radial containment to the cylinder 16, thus avoiding any tendency of the cylinder 16 to bloat or burst during firing. Proper design of the bracket 41 allows the cylinder 16 to be fabricated from plastic, on the order of a shotgun shell.

After activation of the pretensioner 10, only the cartridge 12, including the piston 36 and rack 38, need be removed from the breech block 22 thereof and a new cartridge 12 installed to recondition the system.

FIGS. 4 and 5 illustrate an alternate embodiment of the invention which could be conveniently packaged in the B-pillar of a vehicle. A pretensioner 50 comprises a cartridge 51 having a piston 52 disposed therein. The piston 52 is provided with a pulley 54 at the end thereof.

A seat belt 56 is routed from a seat belt retractor 58 around the pulley 54. When the cartridge 50 is activated, as by an energization of an igniter 60 and ignition of a propellant 62, slack in the seat belt 56 is taken up and the belt 56 is pretensioned. A conventional, normally locked anti-payout mechanism of the seat belt retractor 58 prevents unreeling of the seat belt 56 when load is placed on the seat belt 56 and ensures that all of the travel of the pulley 54 is used to take up slack in the seat belt 56.

As seen in FIG. 6, an alternate embodiment of the invention provides for a programmed decrease in the slack take-up rate thereby to avoid injury to a vehicle occupant. A piston 70 has a rack 72 that is ramped upwardly, as seen in the drawing, so as to complement a pinion gear 74 of increasing diameter. Advancement of the piston 70 and rack 72 effects progressively slower rotation of and increased torque on the pinion gear 74. A rack with the opposite slope ramp could also be applied to reverse the rotation speed and torque profile, if desired.

While the preferred embodiment of the invention has been disclosed, it should be appreciated that the invention is susceptible of modification without departing from the scope of the following claims.

I claim:

1. A pretensioner for a seat belt comprising:
   a breech block,
   a replaceable cartridge in said breech block comprising:
      a cylinder having a closed end and an open end;
      a piston in said cylinder;
      a rack attached to said piston; and
      a pyrotechnic in said cylinder between the closed end thereof and said piston for driving said piston and rack relative to said cylinder toward the open end thereof; and
   means connecting said piston to said seat belt for taking up slack therein upon ignition of said pyrotechnic and advancement of said piston comprising:
      a pinion gear releasably engageable with said rack; and
      a retraction mechanism for the seat belt driven by said pinion gear.

2. The seat belt pretensioner of claim 1 wherein said pinion gear is of varying diameter so as to vary the rate of rotation thereof in relation to advancement of said piston 9 and rack.

3. A pretensioner for a seat belt comprising:
   a breech block;
   a replaceable cartridge in said breech block comprising:
      a cylinder having a closed end and an open end;
      a piston in said cylinder;
      a pyrotechnic in said cylinder between the closed end thereof and said piston for driving said piston relative to said cylinder toward the open end thereof; and
   means connecting said piston to said seat belt for taking up slack therein upon ignition of said pyrotechnic and advancement of said piston comprising
      a pulley connected to said piston and disposed in contact with the seat belt whereby advancement of said piston and said pulley tensions said belt.

* * * * *